United States Patent
Crowder et al.

(10) Patent No.: US 12,060,232 B2
(45) Date of Patent: Aug. 13, 2024

(54) CORE BOX

(71) Applicant: Berry Global, Inc., Evansville, IN (US)

(72) Inventors: Tim Crowder, Portland, TN (US); Nick Addington, Bowling Green, KY (US); Steven Turner, Auburn, KY (US); Cliff Marlin, Franklin, KY (US)

(73) Assignee: Berry Global, Inc., Evansville, IN (US)

( * ) Notice: Subject to any disclaimer, the term of this patent is extended or adjusted under 35 U.S.C. 154(b) by 794 days.

(21) Appl. No.: 17/156,860

(22) Filed: Jan. 25, 2021

(65) Prior Publication Data
US 2021/0229928 A1     Jul. 29, 2021

Related U.S. Application Data

(60) Provisional application No. 62/965,485, filed on Jan. 24, 2020.

(51) Int. Cl.
*B65G 47/06*     (2006.01)
*B65H 19/30*     (2006.01)

(52) U.S. Cl.
CPC .............. *B65G 47/06* (2013.01); *B65H 19/30* (2013.01)

(58) Field of Classification Search
CPC ................................ B65G 47/06; B65H 19/30
See application file for complete search history.

(56) References Cited

U.S. PATENT DOCUMENTS

| | | | |
|---|---|---|---|
| 3,272,329 A | 9/1966 | Mehalov | |
| 3,581,929 A * | 6/1971 | Guenard | B65D 81/022 220/555 |
| 4,573,731 A | 3/1986 | Knaack et al. | |
| 4,874,091 A | 10/1989 | McEwen et al. | |
| 8,011,865 B2 * | 9/2011 | Anderson | B60P 7/12 410/47 |
| 2004/0164209 A1 | 8/2004 | Pachao-Morbitzer et al. | |
| 2015/0083020 A1 | 3/2015 | Lydic et al. | |

FOREIGN PATENT DOCUMENTS

CN     113911525 A    *    1/2022

OTHER PUBLICATIONS

International Search Report and Written Opinion of corresponding International Application No. PCT/US21/14870 mailed Jun. 3, 2021, all enclosed pages cited.

* cited by examiner

*Primary Examiner* — Saul Rodriguez
*Assistant Examiner* — Brendan P Tighe
(74) *Attorney, Agent, or Firm* — Barnes & Thornburg LLP (57) ABSTRACT

A core box with interchangeable rails for holding a variety of sizes of cores.

16 Claims, 7 Drawing Sheets

CORE BOX

PRIORITY CLAIM

This application claims priority under 35 U.S.C. § 119(e) to U.S. Provisional Application Ser. No. 62/965,485, filed Jan. 24, 2020, which is expressly incorporated by reference herein.

TECHNICAL FIELD

The present disclosure relates generally to an apparatus for holding cores, and more specifically to a core box with removable and/or interchangeable rails for holding cores to be wound with tape.

BACKGROUND

It is often desirable to wind rolls of tape on a core. It is often desirable to wind several rolls of tape on cores simultaneously. A core box for holding a plurality of cores to be wound with tape may be helpful.

SUMMARY

Certain embodiments according to the present disclosure provide a core box. The core box may be configured such that it can hold a plurality of cores to be wound simultaneously. The core box may have removable and/or interchangeable rails to facilitate accommodating a variety of cores in a given core box.

In one aspect, for instance, a core box is provided having a first recess having a first side, a second side, and a bottom. The second side is located opposite the first side and the bottom is interposed between the first side and the second side. A first slot is in at least one of the first side, the second side, and the bottom. The first recess extends in a longitudinal direction and the first slot extends in the longitudinal direction. The first slot is configured to receive a first removable rail. The first removable rail includes a plurality of channels. Each channel of the plurality of channels is configured to hold a core of a predetermined size.

In another aspect, for instance, a core box assembly is provided having a first core box and a second core box in back to back relationship. Each of the first core box and the second core box includes a first recess having a first side, a second side, and a bottom. The second side of each is located opposite the first side and the bottom is interposed between the first side and the second side. A first slot of each is in at least one of the first side, the second side, and the bottom. The first recess extends in a longitudinal direction and the first slot extends in the longitudinal direction. The first slot is configured to receive a first removable rail. The first removable rail includes a plurality of channels. Each channel of the plurality of channels is configured to hold a core of a predetermined size. The first recess of the first core box opens in a direction opposite the first recess of the second core box, such that rotating the core box assembly by about 180 degrees will switch the position of the first recess of the first core box with the position of the first recess of the second core box.

In yet another aspect, a method of transferring cores from a core box to a slitter is provided. A core box is provided having at least one recess having a first side, a second side, and a bottom. A first removable rail is provided in the recess, wherein the first removable rail includes a plurality of channels each configured to hold a core. The recess is loaded with a plurality of cores, each core held in position by a channel of the plurality of channels. A spindle is inserted through the plurality of cores. The cores are transferred away from the core box via the spindle. The removable first rail is removed. A second removable rail is inserted having a plurality of second channels configured to hold a second set of cores, each core of the second set of cores having a different dimension from the first set of cores, wherein the different dimension is at least one of width, diameter, and thickness. The recess is loaded with the second set of cores, each core held in position by a channel in the plurality of second channels.

BRIEF DESCRIPTION OF THE DRAWINGS

Embodiments now will be described more fully hereinafter with reference to the accompanying drawings, in which some, but not all embodiments may be shown. Indeed, embodiments may be illustrated or described in many different forms and the present disclosure should not be construed as limited to the embodiments set forth herein. Like numbers refer to like elements throughout, and wherein.

DETAILED DESCRIPTION

Embodiments now will be described more fully hereinafter with reference to the accompanying drawings, in which some, but not all embodiments may be shown. Indeed, embodiments may take many different forms and the present disclosure should not be construed as limited to the embodiments set forth herein; rather, these embodiments are provided so that this disclosure will satisfy applicable legal requirements. As used in the specification, and in the appended claims, the singular forms "a", "an", "the", include plural referents unless the context clearly dictates otherwise.

The terms "substantial" or "substantially" may encompass the whole as specified, according to certain embodiments, or largely but not the whole specified according to other embodiments.

Figure 1:
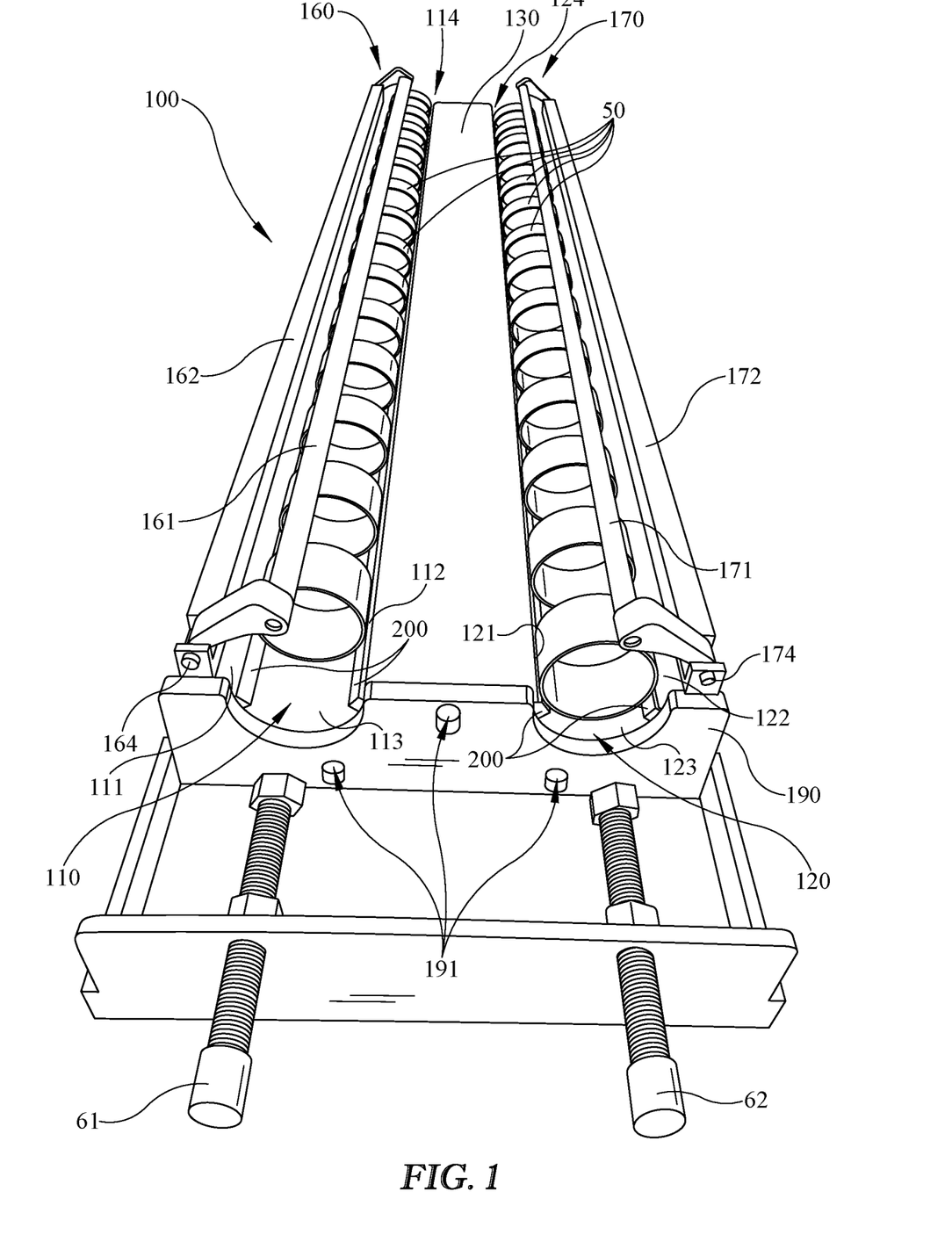
FIG. 1 illustrates a top perspective view of an embodiment of a core box with several cores held in place by a pair of clamps in a closed position.
Figure 2:
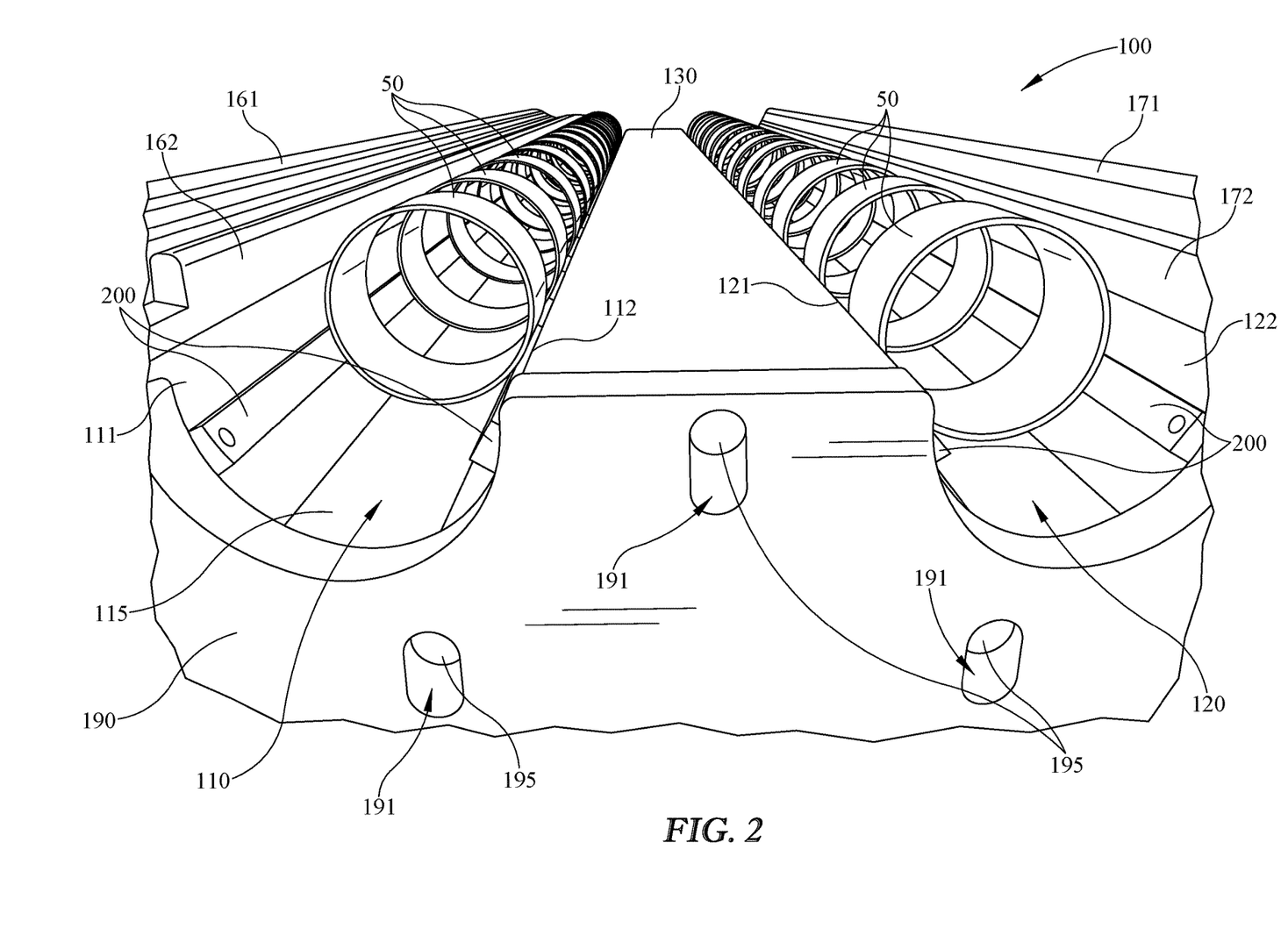
FIG. 2 illustrates a first end perspective view of the core box of FIG. 1 with the clamps in an open position.

Some embodiments of a core box 100, as shown for example in FIGS. 1 and 2, may be provided for holding one or more cores 50 in place during slitting and/or winding of material such as tape onto the cores 50. Core box 100 may include a first recess 110 and/or a second recess 120 extending longitudinally along the top of core box 100 and/or may be configured to hold in alignment a plurality of cores 50. A first clamp 160 may be provided in cooperation with first recess 110 and/or second clamp 170 may be provided in cooperation with second recess 120, either or both of which may be configured to hold cores 50 in place and/or in alignment so that, for example, a spindle may be inserted through the open middle of the cores 50. The spindle or the like (not shown) may be used to hold cores 50 during a winding, slitting, or other operation and/or to transfer cores 50 to another location, for example. Multiple cores 50 may then be wound or provided with material such as a sheet material (e.g., tape) simultaneously. Core box 100 may include a first handle 61 and/or a second handle 62, for example, to facilitate moving or handling core box 100, or for any other reason or combination of reasons.

Figure 3:
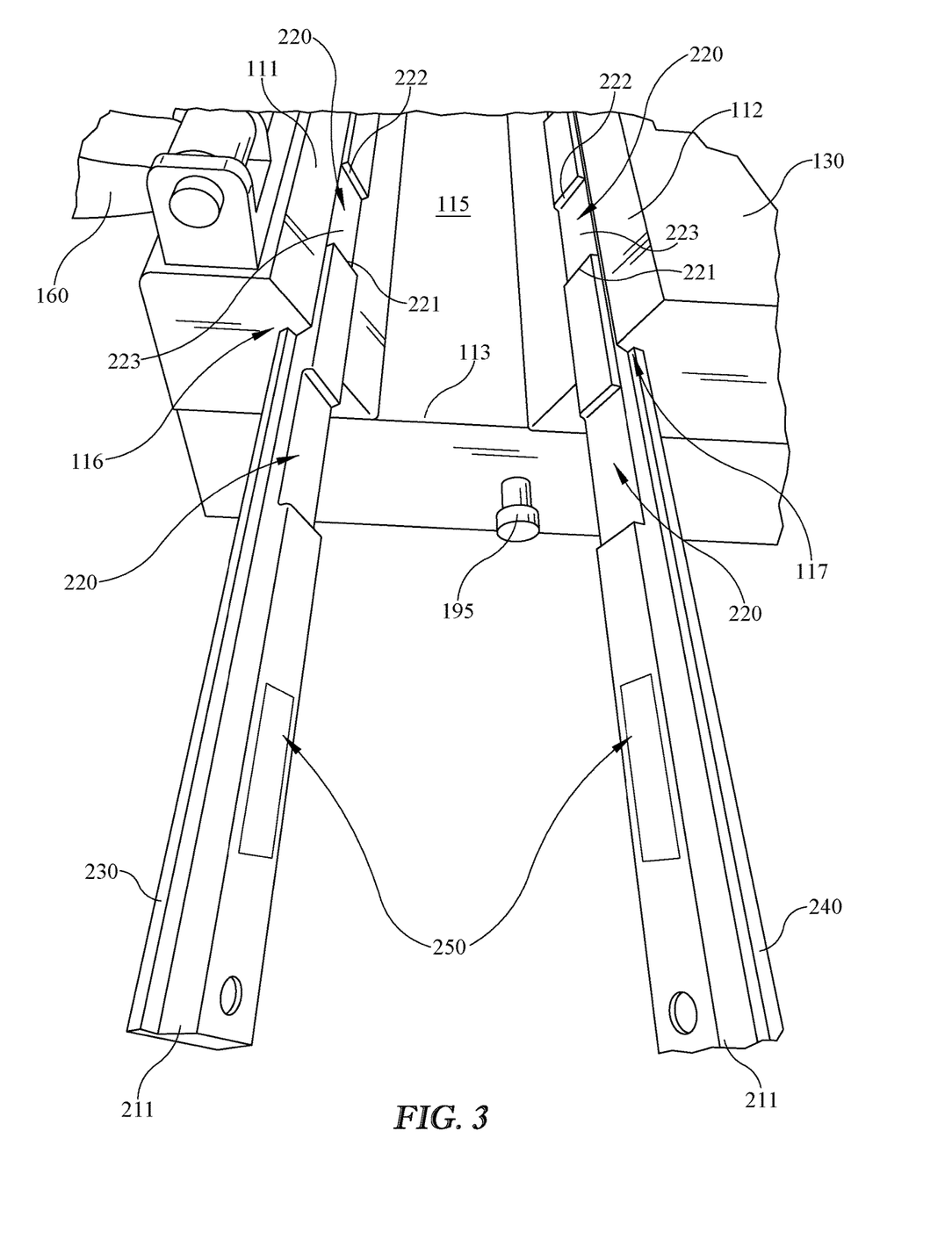
FIG. 3 illustrates a first end perspective view of a portion of the core box of FIG. 1 with a pair of opposing rails partially inserted.

To facilitate holding cores 50 in proper alignment and/or proper spacing relative to one another while being loaded onto a spindle, one or more rails 200 may be provided, as shown for example in FIG. 3. Any or all rails 200 may include one more channels 220 configured to hold cores 50 in place. Rail 200 may extend in a longitudinal direction from a first end 211 to an opposite end. Channel 220 may extend in a longitudinal direction from a first end 221 to a second end 222 to define a channel width, which may be approximately equal to and/or slightly larger than the width of a core 50, and/or channel 220 may include a channel surface 223 which may at least partially support and/or contact core 50. A channel 220 of one rail 200 may align with a channel 220 of another rail 200, so that both channels 220 and/or both rails 200 may cooperate and/or form a channel pair to hold a core 50 in place as shown for example in FIG. 3. It is understood that any or all of first side 111, second side 112, and bottom 115 of first recess 110 may include a slot for a rail 200. For example, while not shown in FIG. 3, a bottom or bottom surface 115 of first recess 110 may include a slot for a rail 200 instead of or in addition to a slot 116 in a first side 11 and a slot 117 in a second side 112. Rail 200 may be provided with a rail indicia 250 to indicate, for example, what size or type of core that particular rail 200 is configured to hold.

First recess 110 may include first side 111, second side 112, a first end 113, a second end 114 opposite first end 113, bottom 115, first slot 116, and/or second slot 117, as shown for example in FIGS. 1 and 3. First recess 110 may be configured to hold a substantially round or cylindrical core 50, for example, by having a somewhat triangular shape as shown for example in FIG. 3, with first side 111 angled relative to the vertical, second side 112 oppositely angled relative to the vertical, and a relatively horizontal bottom surface 115. First side 111 may angle outwardly away from bottom 115 and second side 112 may angle outwardly away from bottom 115 in a direction opposite that of first side 111 to form the triangular shape, or partially triangular shape, of recess 110 shown in FIG. 3. First side 111 may include a first slot 116 and/or second side 112 may include a second slot 117, for example, to facilitate insertion and/or removal of one or more rails 200 as shown in FIG. 3. Rail 200 may include one or more protrusions or flanges 230, 240 to engage slots 116, 117, for example, with rails 200 having a somewhat T-shape to engage a somewhat T-shaped slot as shown. Configuring rails 200 to be removable from core box 100 may facilitate changing out rails 200 to accommodate different cores 50 (e.g., different in size, shape, or type) without necessitating changing out the entire core box 100. Slot 116 and/or slot 117 may extend in a longitudinal direction substantially parallel to the longitudinal direction in which first recess 110 extends.

Second recess 120 may include a first side 121, a second side 122, a first end 123, a second end 124 opposite first end 123, a bottom or bottom surface 125, a first slot 126, and/or a second slot 127. Second recess 120 may be configured to hold a substantially round or cylindrical core 50, for example, by having a somewhat triangular shape, with first side 121 angled relative to the vertical, second side 122 oppositely angled relative to the vertical, and a relatively horizontal bottom surface 125. First side 121 may include a first slot 126 and/or second side 122 may include a second slot 127, for example, to facilitate insertion and/or removal of one or more rails 200. Rail 200 may include one or more protrusions or flanges 230, 240 to engage slots 126, 127. For example, rails 200 having a somewhat T-shape with a first flange 230 and a second flange 240 configured to engage a somewhat T-shaped slot 116, 117 as shown. Configuring rails 200 to be removable from core box 100 may facilitate changing out rails 200 to accommodate different cores 50 (e.g., different in size, shape, or type) without necessitating changing out the entire core box 100.

Referring now to FIGS. 2 and 3, core box 100 may include one or more end plates 190, which may attach to secure rails 200 in place and/or may be removable to facilitate removal of rails 200. End plate 190 may be attached to block access to slot 116 and/or slot 117 to lock rail 200 in place and/or to prevent rail 200 from sliding out of slot 116 or slot 117. End plate 190 may include one or more bolt holes 191 configured to allow attachment or coupling of end plate 190 via bolts 195 to core box 100, for example at or near core box partition 130. Any or all bolt holes 191 may be vertically slotted to allow some vertical movement of end plate 190, for example, when bolts 195 are loosely coupling end plate 190 to partition 130. It is understood that such vertical motion may be further limited or prevented by tightening one or more bolts 195, if included. Partition 130 may be provided to separate first recess 110 from second recess 120, or for any other reason or combination of reasons. While core box 100 is shown having two recesses 110, 120, it is understood that core box 100 alternatively may have more or less than two recesses 110, 120, and/or may have more or less than one partition 130. A first end plate 190 may be coupled to core box 100 at or near first end 113 and/or a second end plate 190 may be coupled to core box 100 at or near second end 114 opposite first end 113. It is understood that a second end plate, if included, could be different from first end plate 190.

Figure 4:
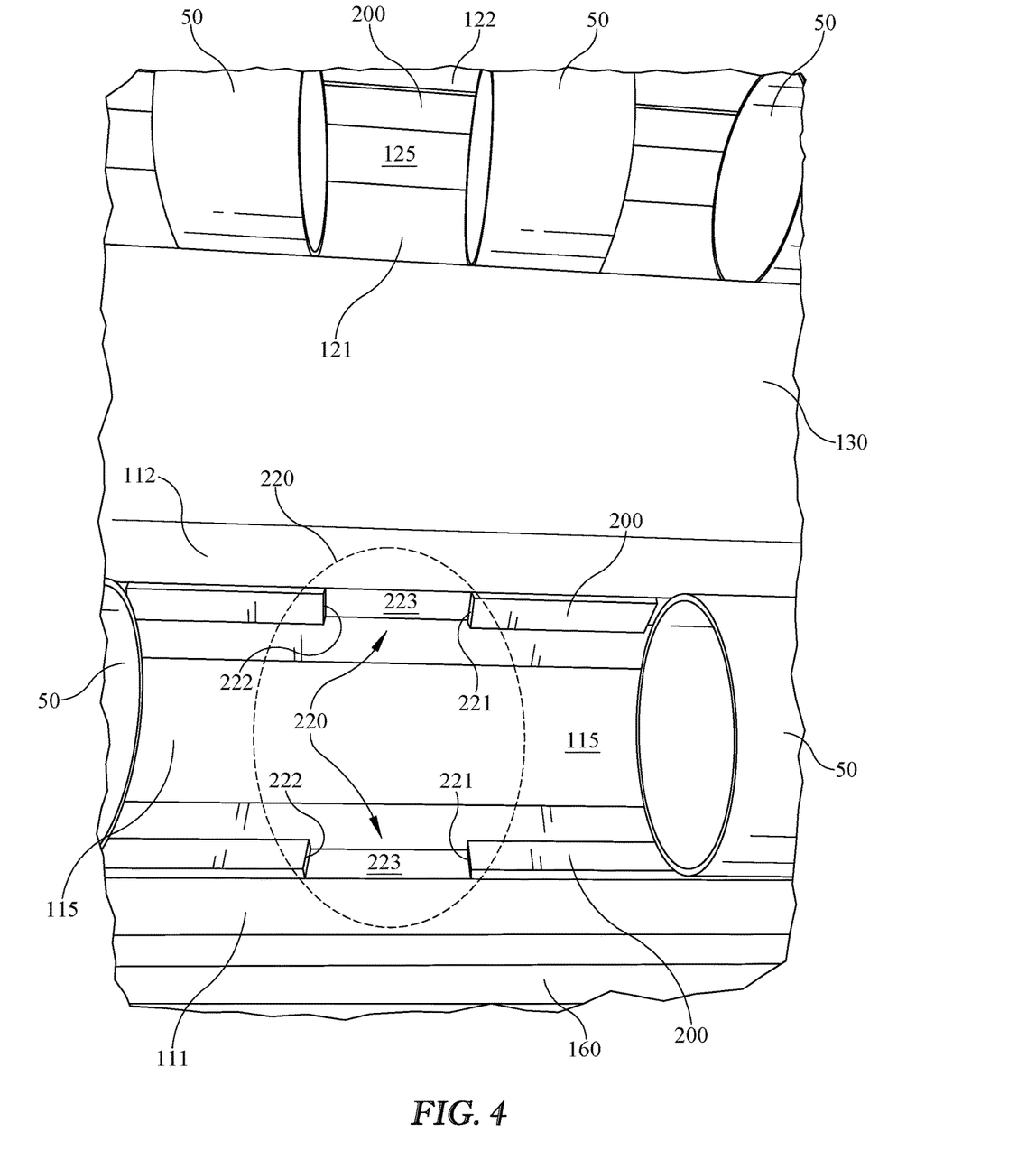
FIG. 4 illustrates a top view of a portion of the core box of FIG. 1 with particular focus on a channel for holding a core formed between two opposing rails.

FIG. 4 shows a portion of an embodiment of core box 100 with a plurality of cores 50 loaded into channels 220, with a pair of opposing channels 220 supporting a single core 50. One core 50 is shown removed to show channels 220 in more detail. Channels 220 may be sized, shaped, aligned, and/or configured to hold in place a given core width (e.g., by varying width from end 221 to end 222), a given diameter (e.g., by varying depth of surface 223 relative to rest of rail 200), or other feature or combination of features.

Figure 5:
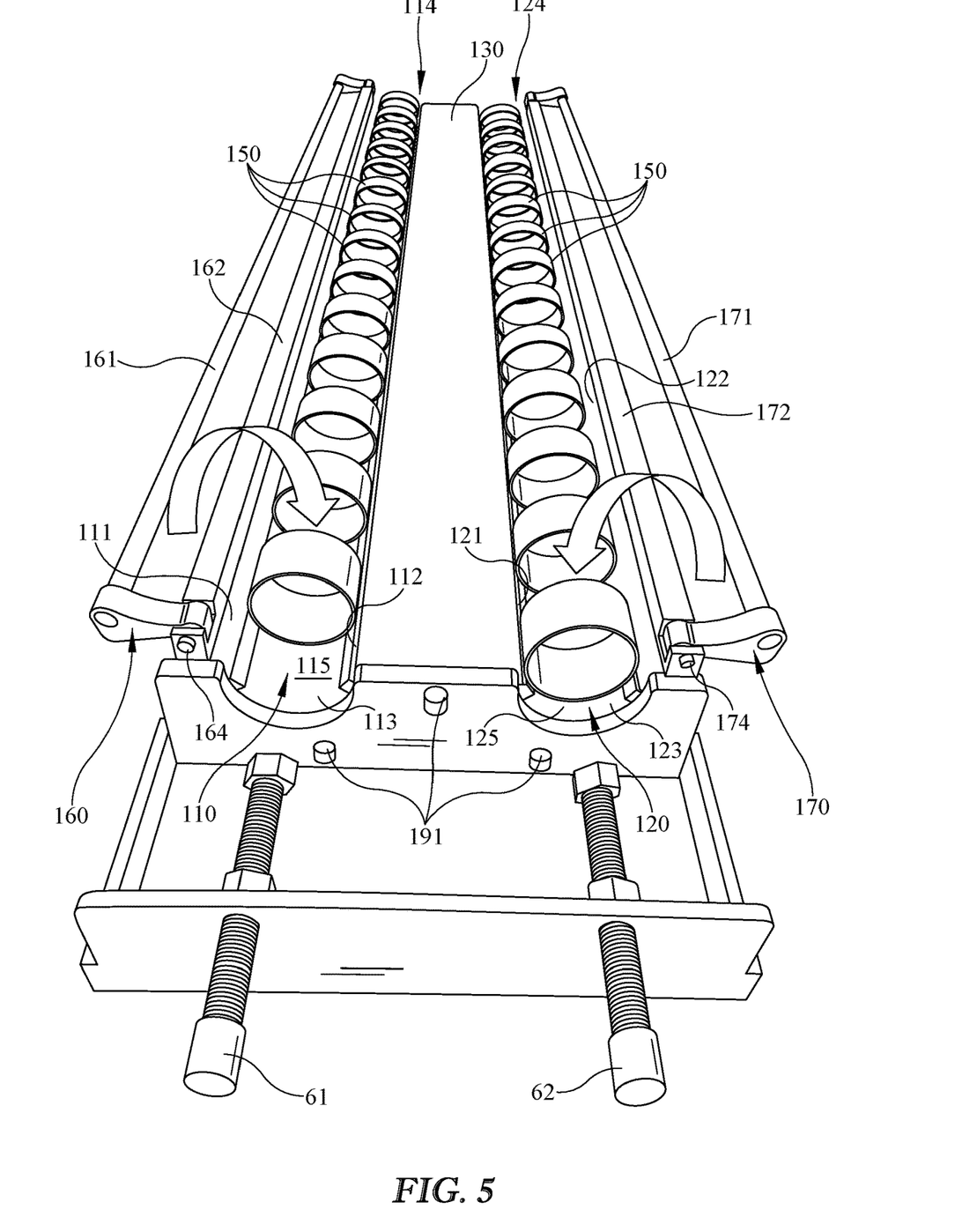
FIG. 5 illustrates a first end perspective view of the core box of FIG. 1 in an open position, with a pair of arrows indicating movement of the clamps from an open position to a closed position.

As shown in FIG. 5, core box 100 may be loaded with cores 50. Either or both of first clamp 160 and second clamp 170 may be moved from an open position as shown in FIG. 5 to a closed position, such as that shown in FIG. 1, as indicated by the arrows. First clamp 160 and/or second clamp 170 may hold cores 50 in place in channels 220 of rails 200 in core box 100. First clamp 160 may include a body 162 coupled to core box 100 at a location proximate first side 111 of first recess 110. First clamp 160 may include a longitudinally extending holding bar 161 configured to hold cores 50 in place in first recess 110. First clamp 160 may include a hinge 164, for example, to facilitate rotating or moving holding bar 161 relative to body 162 between the open position and the closed position. Holding bar 161 may extend longitudinally and/or substantially parallel to a hinge axis through hinge 164.

Second clamp 170 may include a body 172 coupled to core box 100 at a location proximate a first side 121 of second recess 120. Second clamp 170 may include a holding bar 171 configured to hold cores 50 in place in second recess 120. Second clamp 170 may include a hinge 174, for example, to facilitate rotating or moving holding bar 171 relative to body 172 between the open position and the closed position. Holding bar 171 may extend longitudinally and/or substantially parallel to a hinge axis through hinge 174.

Figure 6:
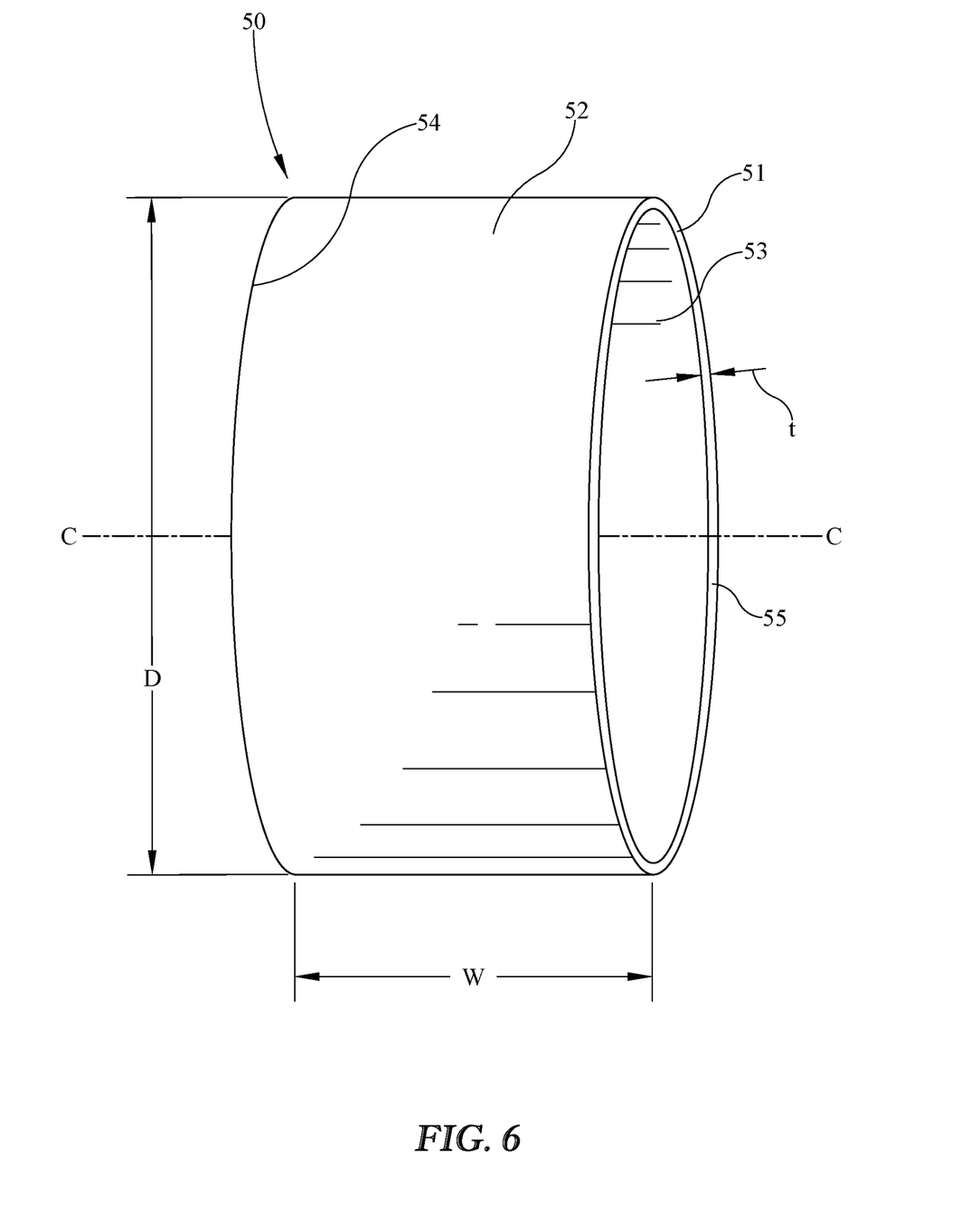
FIG. 6 illustrates a side perspective view of an embodiment of a core.

Core 50 may be cylindrical as shown for example in FIG. 6 and/or be formed including a wall 51 having a thickness t. Core 50 may have a diameter D and/or a width W. Diameter D may be measured approximately perpendicular to an axis or center line C of core 50. Width W may be measured approximately parallel to center line C, for example, from a first edge 54 to a second edge 55. Thickness t may measure the thickness of core 50 from an outside surface 52 to an inside surface 53. Rail 200, channels 220, and/or recess 110, 120 may be sized, shaped, located, and/or configured to accommodate one or more cores 50 having a predetermined size, which may include the width W, diameter D, and/or thickness t of core 50. For example, the distance between first end 221 and second end 222 of channel 220 may correspond to and/or be equal or nearly equal to the width W of core 50. For another example, the distance between first side 111 and second side 112, and/or the distance or width of bottom 115 from first side 111 to second side 112, and/or the angle of first side 111 and/or second side 112 relative to bottom 115 may be configured to accommodate a predetermined diameter D and/or thickness t of core 50. The depth of channel 220 at channel surface 223, or the degree to which channel 220 is notched or cutout relative to the rest of rail 200, may be configured to accommodate a predetermined diameter D and/or thickness t of core 50 instead of or in addition to the size, shape, and/or configuration of recess 110. The size, shape, and/or configuration of rail 200 and/or channel 220 may cooperate with the size, shape, and/or configuration of recess 110, first side 111, second side, 112, and/or bottom 115 to accommodate and/or hold a core 50 of predetermined size, shape, width W, diameter D, and/or thickness t.

Figure 7:
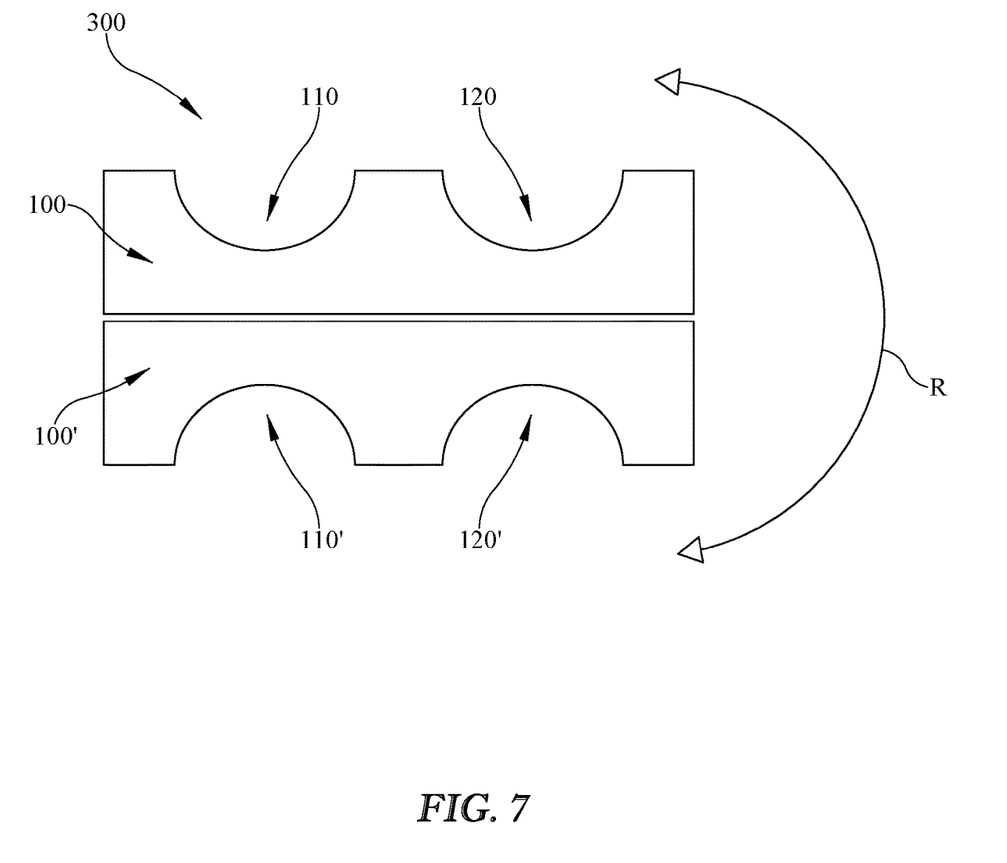
FIG. 7 illustrates a side elevation view of an embodiment of two core boxes combined back to back, which may be rotated to provide use of varying core boxes and/or rail geometries, for example.

A first core box 100 and a second core box 100' may be placed in proximity, for example, back to back as shown in FIG. 7 to provide a core box assembly 300. Second core box 100' may have its own first recess 110' and/or a second recess 120'. Core box assembly 300 may facilitate moving or rotating between a first position in which core box 100 is on top and a second position in which core box 100' is on top, for example, as indicated by rotation R. Recesses of core box assembly 300 may be varied relative to one another and/or may include rails 200 configured to hold varying cores 50 so that core box assembly 300 may be quickly rotated to provide quick access to various cores 50. For example, a 3" diameter D of cores 50 may be loaded into core box 100, with corresponding geometry of rails 200 and/or rail channels 220, and core box 100 may be mounted back to back with core box 100' configured to receive cores 50 having diameter D of about 1.5".

Core box assembly 300 is illustrated in FIG. 7 as having recesses 110, 120, 110', 120' having a somewhat round shape rather than the triangular shape shown in the other figures. It is understood that any or all recesses may be triangular, round, any other shape or combination of shapes, and/or free form. It is further understood that, even if round, curved, semi-circular, or the like, any or all recesses may be considered to have a first side, a second side opposite the first side, and a bottom interposed between the first side and the second side. First recess 110 and/or second recess 120 of first core box 100 may open in a direction opposite first recess 110' and/or second recess 120' of second core box 100', such that rotating core box assembly 300 by about 180 degrees will switch the position of first recess 110 of first core box 100 with the position of first recess 110' of second core box 100'. For example, first recess 110 and/or second recess 120 may open upwardly while first recess 110' and/or second recess 120' of second core box 100' open in the opposite direction or downwardly. Core box assembly 300 may be rotated, flipped, or inverted by approximately 180 degrees to switch the orientation and/or so that first recess 110 and/or second recess 120 of first core box 100 now open downwardly and the first recess 110' and/or second recess 120' of second core box 100' open in the opposite direction, or upwardly. In a situation where a user may access an upwardly opening recess more easily, the recess and its given configuration may be made more easily accessible by moving and/or rotating core box assembly 300.

In use, a user may provide core box 100 and/or core box assembly 300. The user may insert one or more rails 200 having channels 220 corresponding to and/or configured to accept or hold one or more cores 50 to be wound with material such as sheet material and/or tape. For example, the user may insert rail(s) 200 into a first slot 116 and/or a second slot 117 of a first recess 110 in core box 100. Recess 110, 120, rail(s) 200, and/or channels 220 may have a size, depth, configuration, and/or shape corresponding to a given geometry or type of core 50, as discussed above. A second recess 120 may be provided and one or more additional rail(s) 200 may inserted into second recess 120. Rail(s) 200 inserted into second recess 120 may be substantially similar to the rail(s) of first recess 110, or may be different, for example, with different size, shape, spacing, and/or configuration of one or more channels 220. First recess 110 and second recess 120 may be similarly configured, or they may be different in size, shape, and/or configuration. The recess(es) 110, 120 and/or rail(s) 200 (or rail channels 220) may be loaded with one or more cores 50, with any or all rails 200 or rail channels 220 holding cores 50 in alignment and with desired spacing from one another. One or more clamps 160, 170 may be moved from an open position in which cores 50 may be loaded into core box 100, first recess 110, and/or second recess 120, to a closed position in which clamps 160, 170, and/or holding bars 161, 171 may hold cores 50 in place. A spindle may be inserted through the centers of the loaded cores 50 and/or the spindle may transfer the cores 50 to a slitter and/or to a winder or equipment for winding or applying material such as tape or other sheet material to cores 50.

In some embodiments using a core box assembly 300 including, for example, a first core box 100 and a second core box 100', first core box 100 may be provided and/or used to load and transfer cores 50 to a spindle, for example, as described above. Core box assembly 300 may be rotated or moved from a first position in which core box 100 is on top to a second position in which core box 100 is on bottom and/or second core box 100' is on top. Core box 100' may be configured to hold cores 50 having differing geometry or other characteristics from the cores 50 used in core box 100 (e.g., different diameter D, width W, and/or thickness t). A user may cause transfer of cores 50 in core box 100 to a spindle, for example, as described above, and the user may quickly transition to a different set of cores 50 having differing characteristics by rotating or flipping core box assembly 300 to make the second core box 100' accessible. In this way, for example, different cores 50 may be quickly and easily loaded onto a spindle and/or transferred to a slitter, a winder, and/or other equipment.

It is understood that, while some directional terms are used herein, such as top, bottom, upper, lower, inward, outward, upward, downward, etc., these terms are not intended to be limiting but rather to relate to one or more exemplary orientations, positions, and/or configurations of core box 100 or 100' and/or core box assembly 300, and/or any component thereof. It is understood core box 100 or 100' and/or core box assembly 300 and/or any component or portion thereof may be inverted or re-oriented to face or point a different direction without departing from the nature of core box 100 or 100' and/or core box assembly 300 disclosed herein.

These and other modifications and variations may be practiced by those of ordinary skill in the art without departing from the spirit and scope, which is more particularly set forth in the appended claims. In addition, it should be understood that aspects of the various embodiments may be interchanged in whole or in part. Furthermore, those of ordinary skill in the art will appreciate that the foregoing description is by way of example only, and it is not intended to limit the scope of that which is described in the claims. Therefore, the spirit and scope of the appended claims should not be limited to the exemplary description of the versions contained herein.

That which is claimed:

1. A core box, comprising:
   a first recess having a first side, a second side, and a bottom;
   wherein the second side is located opposite the first side and the bottom is interposed between the first side and the second side;
   a first slot in at least one of the first side, the second side, and the bottom;
   wherein the first recess extends in a longitudinal direction and the first slot extends in the longitudinal direction;
   wherein the first slot is configured to receive a first removable rail; and
   wherein the first removable rail includes a plurality of channels spaced apart from one another along the removable rail in the longitudinal direction; and
   wherein each channel of the plurality of channels is configured to hold a core of a predetermined size.

2. The core box of claim 1, wherein the first slot extends substantially parallel to the recess.

3. The core box of claim 1, wherein the first slot is in the first side of the first recess, and wherein the core box further comprises a second slot in the second side of the first recess.

4. The core box of claim 3, wherein the second slot extends substantially parallel to the recess.

5. The core box of claim 3, further comprising a second removable rail, wherein the second slot is configured to receive the second removable rail, and the second removable rail includes a plurality of channels, and wherein each channel of the plurality of channels in the second removable rail is configured to hold the core of a predetermined size.

6. The core box of claim 5, wherein each channel of the plurality of channels in the first removable rail corresponds with a channel of the plurality of channels in the second removable rail to form a channel pair configured to cooperate to hold the core.

7. The core box of claim 1, wherein the predetermined size of the core includes a core width, and wherein each channel of the plurality of channels extends in the longitudinal direction from a first channel end to a second channel end a distance approximately equal to the core width.

8. The core box of claim 1, wherein the predetermined size of the core includes a core diameter, and wherein each channel of the plurality of channels has a channel surface corresponding to the core diameter.

9. The core box of claim 1, wherein the bottom of the recess extends horizontally in a direction transverse to the longitudinal direction, wherein the first side of the recess extends at an angle outwardly away from the bottom, and wherein the second side of the recess extends at an angle outwardly away from the bottom to form a triangular shaped recess.

10. The core box of claim 9, wherein the first slot is in the first side of the recess, and further comprising a second slot in the second side, the second slot configured to receive a second removable rail.

11. The core box of claim 10, wherein the first side, the second side, the bottom of the recess, the first removable rail, and the second removable rail are configured to a receive a core having a predetermined diameter.

12. A core box assembly, comprising:
   a first core box and a second core box in back to back relationship;
   the first core box comprising:
   a first recess having a first side, a second side, and a bottom;
   wherein the second side is located opposite the first side and the bottom is interposed between the first side and the second side;
   a first slot in at least one of the first side, the second side, and the bottom;
   wherein the first recess extends in a longitudinal direction and the first slot extends in the longitudinal direction;
   wherein the first slot is configured to receive a first removable rail; and
   wherein the first removable rail includes a plurality of channels; and
   wherein each channel of the plurality of channels is configured to hold a core of a predetermined size;
   the second core box comprising:
   a first recess having a first side, a second side, and a bottom;
   wherein the second side is located opposite the first side and the bottom is interposed between the first side and the second side;
   a first slot in at least one of the first side, the second side, and the bottom;
   wherein the first recess extends in a longitudinal direction and the first slot extends in the longitudinal direction;
   wherein the first slot is configured to receive a first removable rail; and
   wherein the first removable rail includes a plurality of channels; and
   wherein each channel of the plurality of channels is configured to hold a core of a predetermined size; and
   wherein the first recess of the first core box opens in a direction opposite the first recess of the second core box, such that rotating the core box assembly about an axis extending in the longitudinal direction by about 180 degrees will switch the position of the first recess of the first core box with the position of the first recess of the second core box.

13. The core box assembly of claim 12, wherein the first core box includes a second recess and the second core box includes a second recess.

14. The core box assembly of claim 12, wherein the first recess and the first removable rail of the first core box are configured to hold a core having a first size, and wherein the first recess and first removable rail are configured to hold a core having a second size that is different than the first size.

15. The core box assembly of claim 14, wherein the first size includes a first width, the second size includes a second width, and the first width is different than the second width.

16. The core box assembly of claim 14, wherein the first size includes a first diameter, the second size includes a second diameter, and the first diameter is different than the second diameter.

* * * * *